(12) United States Patent
Stowell et al.

(10) Patent No.: US 11,064,338 B2
(45) Date of Patent: Jul. 13, 2021

(54) HEADS UP MASS NOTIFICATION

(71) Applicant: JOHNSON CONTROLS FIRE PROTECTION LP, Boca Raton, FL (US)

(72) Inventors: John B. Stowell, Hollis, NH (US); Alan John Boguslawski, Gardner, MA (US)

(73) Assignee: JOHNSON CONTROLS FIRE PROTECTION LP, Boca Raton, FL (US)

(*) Notice: Subject to any disclaimer, the term of this patent is extended or adjusted under 35 U.S.C. 154(b) by 0 days.

(21) Appl. No.: 16/455,004

(22) Filed: Jun. 27, 2019

(65) Prior Publication Data
US 2020/0413237 A1    Dec. 31, 2020

(51) Int. Cl.
| | |
|---|---|
| *H04W 4/90* | (2018.01) |
| *G02B 27/18* | (2006.01) |
| *H04W 76/50* | (2018.01) |
| *G08B 21/02* | (2006.01) |
| *G08B 25/10* | (2006.01) |
| *H04W 4/02* | (2018.01) |
| *H04W 68/10* | (2009.01) |

(52) U.S. Cl.
CPC .............. *H04W 4/90* (2018.02); *G02B 27/18* (2013.01); *G08B 21/02* (2013.01); *G08B 25/10* (2013.01); *H04W 4/02* (2013.01); *H04W 68/10* (2013.01); *H04W 76/50* (2018.02)

(58) Field of Classification Search
CPC ......... H04W 4/90; H04W 68/10; H04W 4/02; H04W 76/50; G02B 27/18; G08B 25/10; G08B 21/02; G03B 21/10
See application file for complete search history.

(56) References Cited

U.S. PATENT DOCUMENTS

| | | | |
|---|---|---|---|
| 9,530,302 B2 | 5/2016 | Thomas | |
| 9,922,509 B2 | 3/2018 | Marien | |
| 2002/0163720 A1 | 11/2002 | Piepel et al. | |
| 2009/0015515 A1* | 1/2009 | Ichieda | H04N 5/74 345/33 |
| 2009/0289802 A1* | 11/2009 | Pearce | A63J 99/00 340/584 |
| 2010/0022220 A1 | 1/2010 | Gupta et al. | |
| 2010/0253594 A1 | 10/2010 | Szczerba et al. | |
| 2015/0339870 A1 | 11/2015 | Cojocaru | |
| 2017/0374244 A1* | 12/2017 | Swaminathan | G01S 3/00 |
| 2018/0077346 A1* | 3/2018 | Honda | H04N 5/23203 |
| 2018/0204429 A1 | 7/2018 | Savage et al. | |
| 2019/0273915 A1* | 9/2019 | Oberascher | H04N 13/363 |
| 2019/0371137 A1 | 12/2019 | Fortin et al. | |

FOREIGN PATENT DOCUMENTS

| | | |
|---|---|---|
| DE | 202014002931 U1 | 5/2014 |
| EP | 2330802 A1 | 6/2011 |

OTHER PUBLICATIONS

PCT/ISA/206 issued in counterpart PCT Application No. PCT/US2020/039153 issued Sep. 16, 2020.

* cited by examiner

*Primary Examiner* — Christopher M Brandt
(74) *Attorney, Agent, or Firm* — Arent Fox, LLP

(57) ABSTRACT

Aspects of the present disclosure include methods, apparatus, and systems for mass notification including receiving the message from a server via a link and causing the projector to project the message on a surface using the light patterns.

23 Claims, 12 Drawing Sheets

HEADS UP MASS NOTIFICATION

BACKGROUND

Existing infrastructures may include numerous alarm notification devices that provide basic warnings (e.g., activating siren, audio, and/or flashing strobes) to occupants of the infrastructures during occurrences of hazard (e.g., fire, intruder in the infrastructures, power outage, etc.). When the occupants receive the warnings from the alarm notification devices, they may evacuate the infrastructures via the nearest exits. However, the nearest exists may not be safe (e.g., origin of the fire, point of entry for the intruder, etc.). To properly and safely avoid the hazard, detailed warnings may be necessary. While the alarm notification devices may be pervasive, they are unable to provide the detailed warnings to the occupants. For example, the alarm notification devices may be able to alert the occupants of the presences of the hazard, but they are unable to guide the occupants away from the hazard. Although there exists dynamic notification devices, it may be prohibitively expensive and time-consuming to install enough dynamic notification devices throughout an infrastructure to ensure that most, if not all, occupants are able to access detailed warnings or instructions. Therefore, improvements in mass notification may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Certain aspects of the present disclosure includes a message notification device comprising a projector configured to emit light patterns, a projection control module (PCM) communicatively coupled with the projector, wherein the PCM is configured to: receive a message from a server via a link, and cause the projector to project the message on a surface by emitting the light patterns.

Some aspects of the present disclosure includes an integrated notification device having a link that provides a communication channel with a server, a projector configured to emit light patterns, a projection control module (PCM) connected with the link and the projector, wherein the PCM is configured to receive a message from the server via the link and cause the projector to project the message on a surface using the light patterns.

An aspect of the present disclosure includes a method for projecting a message including receiving the message from a server via a link of an alarm notification device, and causing the projector to project the message on a surface using the light patterns.

An aspect of the present disclosure includes a method for mass notification including receiving an indication signal from at least one detector in an infrastructure, wherein the indication signal is transmitted by the at least one detector in response to detecting a hazard in the infrastructure, generating one or more messages, wherein the plurality of messages is associated with the hazard, transmitting the plurality of messages to a plurality of integrated notification devices, and wherein each of the plurality of integrated notification devices includes a link that provides a communication channel with a server, a projector configured to emit light patterns, and a projection control module (PCM) connected with the link and the projector, wherein the PCM is configured to receive a message from the server via the link and cause the projector to project the message on a surface using the light patterns.

Certain aspects of the present disclosure includes a mass notification system having at least one hazard detector configured to: detect a hazard, and transmit an indication signal to a server in response to detecting the hazard, a plurality of integrated notification devices, each of the plurality of the plurality of integrated notification devices comprises: an alarm notification device including: a terminal block, a first link that receives first electrical energy from a source, and a second link that provides a communication channel with the server, wherein the first link and the second link are connected with the terminal block, and a message notification device including: a third link coupled with the first link via the terminal block, a fourth link coupled with the second link via the terminal block, a projector configured to emit light patterns, a PCM connected with the third link, the fourth link, and the projector, wherein the PCM is configured to: receive second electrical energy via the third link, wherein the second electrical energy is a portion of the first electrical energy, receive a message of a plurality of messages via the fourth link, and cause the projector to display the message of the plurality of messages on a surface using the light patterns, and the server configured to: receive the indication signal from the detector, generate the plurality of messages, wherein the plurality of messages is associated with the hazard, and transmit the plurality of messages to the plurality of integrated notification devices via the second links.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

According to aspects of the present disclosure, using message notification devices with existing alarm notification devices may create a live platform for mass notifications and instructions within a building. Aspects of the present disclosure may capitalize on the distributed notification devices. By relying on the live platform, occupants may remain vigilant and aware of their surroundings while following the safest and most up-to-date instructions based on the data being collected by the fire, security, and/or controls systems of the building. By constantly analyzing the environment throughout the entire building, the message notification devices may update and display the safest strategy for numerous emergency situations, tailored for every section of the building. In some implementations, the integrated notification devices may also provide visual aids and instructions for audible-impaired occupants. In some implementations, the integrated notification devices may also display non-emergency notifications such as public announcements, visual advertisements, videos, or other marketing collateral when the emergency mass notification system is not in use.

In some aspects, the integrated notification devices may allow an occupant to have a natural viewing angle to read the notifications while remaining aware of the situation in the surrounding areas. By projecting below, or around, an alarm notification device, the reading area projected by the integrated notification devices may be placed in the line-of-sight of the occupants. The message notification devices for retrofitting the alarm notification devices may conform to the National Fire Protection Association (NFPA) standard.

In certain aspects of the present disclosure, the message notification device may be integrated into the notification network or function as a smart home device that creates an "invisible" interface that only appears when needed, requested, or triggered. Alternatively, the message notification device may include a blank screen for projecting images and/or messages. The screen may display the projected images and/or messages. The message notification device may include LED projection for display and/or infra-red (IR) laser diode and sensor/detector to allow a user to interact with the settings. The IR maps the location of the fingers/hands of the users and processes the movements based on displayed content and modifiable settings.

Figure 1:
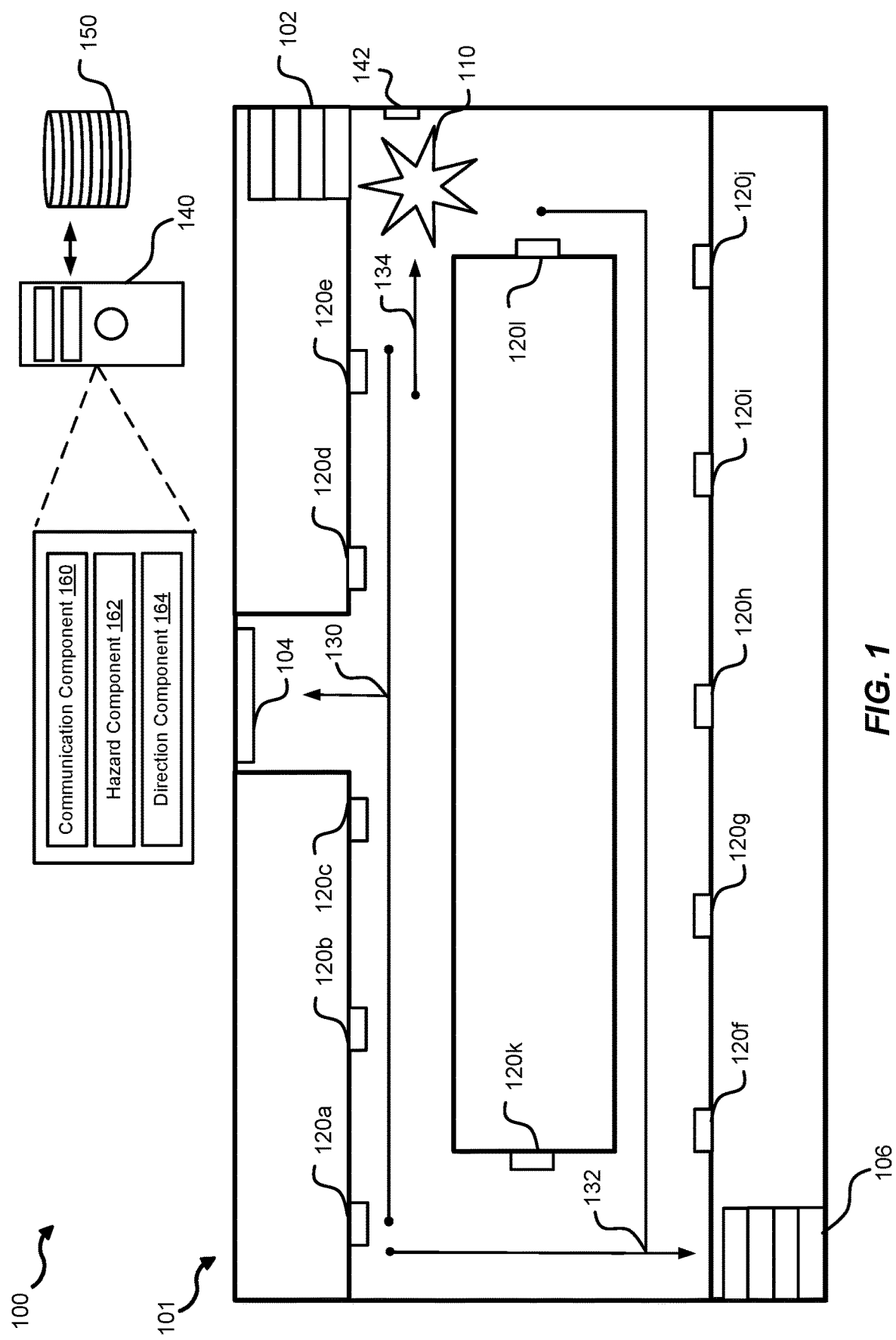
FIG. 1 illustrates an example of an environment for implementing one or more integrated notification device in accordance with aspects of the present disclosure.

Turning now to FIG. 1, a top-view of an infrastructure 101 may illustrate an example of an environment 100 for mass notification. The environment 100 may include the infrastructure 101. The infrastructure may have a first staircase 102 (aka "East Staircase") for ingress into and egress out of the infrastructure 101 and/or reaching different floors of the infrastructure 101. The infrastructure 101 may have an exit 104 (aka "North Exit") for ingress into and egress out of the infrastructure 101. The infrastructure 101 may have a second staircase 106 (aka "West Staircase") for ingress into and egress out of the infrastructure 101 and/or reaching different floors of the infrastructure 101. The environment 100 may include integrated notification devices 120a-1 configured to receive notifications and display messages. The integrated notification devices 120a-1 may be placed in compliance with one or more local or national standards, such as the NFPA standard.

In some implementations, the environment 100 may include a server 140 for receiving hazard information and/or transmitting messages to be displayed by the integrated notification devices 120a-1. In some examples, the server 140 may be a standalone server or a fire panel. The server 140 may be communicatively coupled with a repository 150. The server 140 and/or the repository 150 may be local or remote. The server 140 may include a communication component 162 for receiving hazard information from fire and/or security control systems (not shown) associated with the infrastructure 101. The communication component 160 may transmit messages to be displayed by the integrated notification devices 120a-1. The server 140 may include a hazard component 162 that analyzes one or more hazards that may occur within the infrastructure 101 and provides appropriate messages corresponding to the one or more hazards. The messages may be stored in the integrated notification devices 120a-1 and selected by the server 140 depending on the analysis of the one or more hazards. Alternatively, the messages may be transmitted to the integrated notification devices 120a-1 by the server 140. In one implementation, the server 140 may transmit the same message to the integrated notification devices 120a-1. For example, the integrated notification devices 120a-1 may display the same message among the integrated notification devices 120a-1. In another implementation, the server 140 may transmit different messages to the integrated notification devices 120a-1. In another example, a portion of the integrated notification devices 120 may display a first message and a different portion of the integrated notification devices 120 may display a second message different from the first message. The server 140 may include a direction component 164 that analyzes the location of any hazard and provides an appropriate escape route. In one example, the messages provided by the server 140 may include warnings and/or escape routes. The integrated notification devices 120a-1 may be placed on the walls of the infrastructure 101. The integrated notification devices 120a-1 may be placed at "eye level," or between 5-9 feet above the floor.

In certain aspects of the present disclosure, the server 140 may analyze, control, store (in the repository 150), distribute, transmit, receiver, and/or relay the hazard information, transmitting messages, environmental data, or other information.

During an emergency, a hazard 110 may occur within the infrastructure 101. The hazard 110 may occur near (e.g., within 1 foot, 2 feet (ft), 3 ft, 5 ft, 10 ft, or more) the first staircase 102. The hazard 110 may include a fire (accidental or intentionally set), a security breach, an intruder, an active-shooter, a carbon monoxide leak, or other events that may cause harm to the occupants. Alternatively, the hazard 110 may include events that do not occur within a specific location within the infrastructure 101, such as an earthquake, severe weather, lockdowns, or other threatening or non-threatening events.

During the emergency, each of integrated notification devices 120a-1 may display the same message or different messages based on the known hazard (e.g., hazard 110) to guide the occupants to safety. The messages may include the same recommendation or different recommendations to be taken by the occupants, the types of hazard detected, emergency contact information, recommended escape routes, directions to safe exits closest to the integrated notification devices 120a-1, or other appropriate message to help the occupants in the emergency.

In one non-limiting example, a hazard detector 142 may transmit an indication of hazard to the server 140 associated with the hazard 110 occurring near the first staircase 102. The hazard detector 142 may be an optical smoke detector, a passive infra-red detector, an ionization smoke detector, a carbon-monoxide detector, an intrusion alarm, a water leak detector, or other detectors. In response, the hazard component 162 may analyze the hazard 110 and determine that the hazard 110 is a fire that renders the first staircase 102 inaccessible. The direction component 164 may determine escape routes 130, 132. The communication component 160 may transmit individualized or different messages to the integrated notification devices 120a-1. For example, the communication component 160 of the server 140 may transmit a message ("Evacuate→North Exit") to the integrated notification devices 120a, 120b, 120c. The message, when projected onto the wall, recommends the occupants reading the message projected by the integrated notification devices 120a, 120b, 120c to evacuate the infrastructure 101 ("Evacuate"), walk toward the right direction ("→"), and leave the infrastructure 101 via the North Exit ("North Exit," or equivalently, the exit 104). The message may recommend the occupants to exit the infrastructure along the escape route 130. In some implementations, the hazard detector 142 may be one or more hazard detectors.

In some examples, the communication component 160 of the server may transmit a message ("Evacuate←North Exit") to the integrated notification devices 120d, 120e. The message, when projected onto the wall, recommends the occupants reading the messages projected by the integrated notification devices 120d, 120e to evacuate the infrastructure 101 ("Evacuate"), walk toward the right direction ("←"), and leave the infrastructure 101 via the North Exit ("North Exit," or equivalently, the exit 104). The message may recommend the occupants to exit the infrastructure along the escape route 130.

In some examples, the direction component 164 may determine that the integrated notification device 120e should not display the message ("Evacuate→East Staircase") even though the integrated notification device 120e is closer to the first staircase 102 ("East Staircase") than the exit 104 ("North Exit"). If the integrated notification device 120e displays the "Evacuate→East Staircase" message, occupants following the recommendation along a route 134 may be unable to evacuate the infrastructure 101 because the hazard 110 may obstruct the access to the first staircase 102 ("East Staircase"). Therefore, even though the integrated notification device 120e is closer to the first staircase 102 ("East Staircase") than the exit 104 ("North Exit"), the direction component 164 may determine that the message to be displayed by the integrated notification device 120e is "Evacuate←North Exit."

In some implementations, the communication component 160 of the server 140 may transmit messages to the integrated notification devices 120f, 120g, 120h, 120i, 120j, 120k, 120l that recommend the occupants to evacuate along the escape route 132. For example, the messages displayed by the integrated notification devices 120f, 120g, 120h, 120i, 120j, 120k may be "Evacuate→West Staircase." The message displayed by the integrated notification devices 120l may be "Evacuate←West Staircase."

In alternative implementations, the hazard 110 may include an active shooter is in the infrastructure 101. The hazard component 162 may determine that the recommendation is for the occupants to return to a nearest room and bar the door. The communication component 160 may send the message ("Return to Room Bar Door") to be displayed by the integrated notification devices 120a-1. Alternatively, if the location of a shooter is known, the message may identify the location of the shooter and/or provide an escape route.

In another instance, the hazard 110 may include a severe weather (e.g., tornado, typhoon, thunderstorm, etc.). The hazard component 162 may determine that the recommendation is for the occupants to stay indoor within the infrastructure. The communication component 160 may send the message ("Stay Indoor") to be displayed by the integrated notification devices 120a-1.

Figure 2:
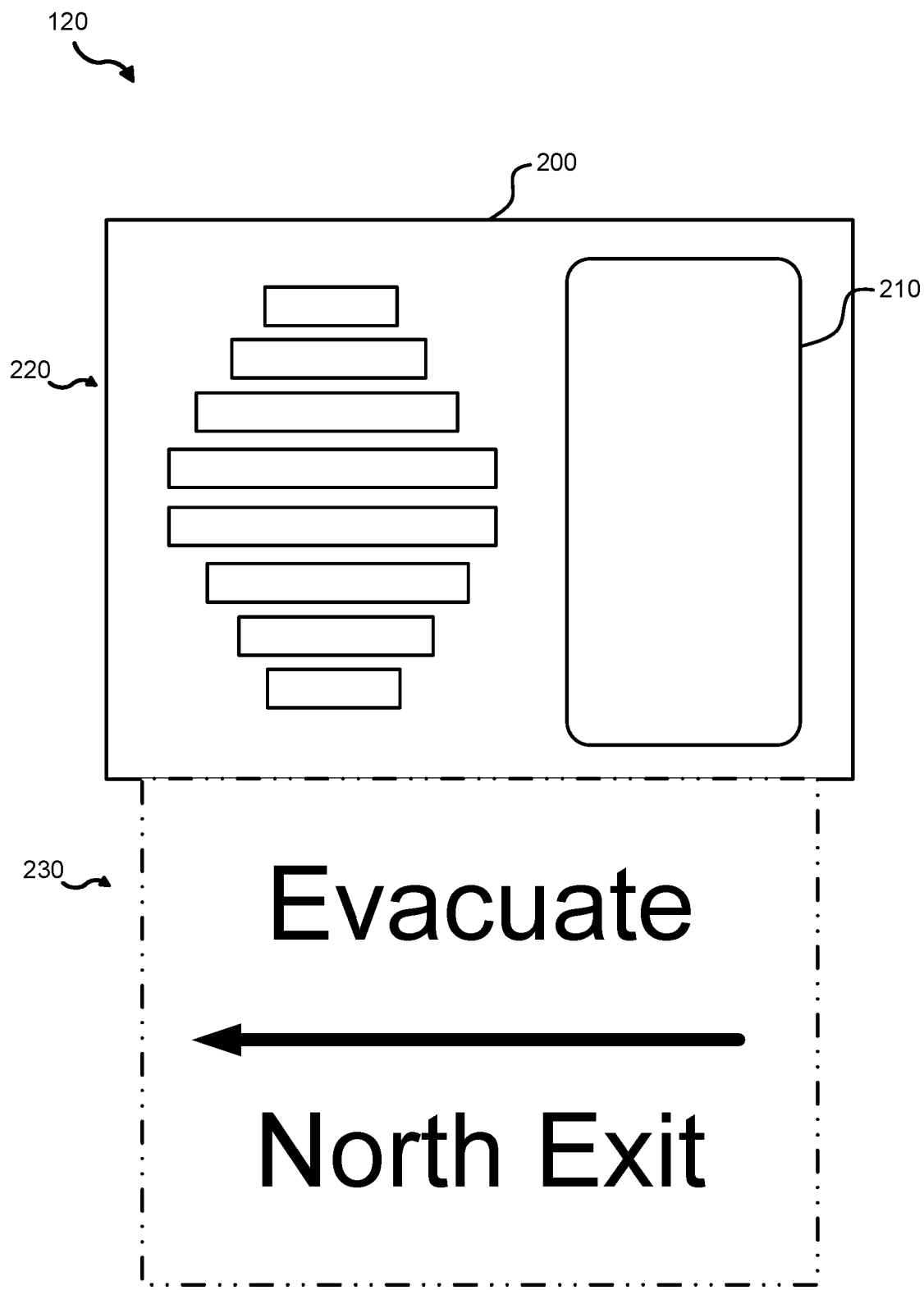
FIG. 2 illustrates an example of a frontal view of an integrated notification device in accordance with aspects of the present disclosure.

Referring to FIG. 2, an example of the integrated notification device 120 may include an alarm notification device 200. The alarm notification device 200 may include a visual notification indicator 210 that provides visual notifications (e.g., strobe lights, flashing lights). The alarm notification device 200 may include a speaker 220 that broadcasts audio notifications. The integrated notification device 120 may display messages in a display area 230 near the integrated notification device 120, such as beneath the integrated notification device 120. In other implementations, the display area 230 may be to the left, right, above and/or below the integrated notification device 120. In certain implementations, the display area 230 may display the messages in two or more directions. The display area 230 may be a surface near the integrated notification device 120, such as a portion of a wall or a projector screen. A projector screen may include a wall-mounted or pull-down white or gray screen. In some implementations, the projector may project different patterns of light onto the display area (e.g., wall, screen) to display a message, one or more words, one or more shapes, one or more signs or symbols, or other patterns. In one example, the projector may display the message "Evacuate North Exit," which includes the words "Evacuate" and "North Exit," and the symbol "←."

According to some aspects, the integrated notification device 120 may display advertisements, public announcements, non-threatening messages, or other messages when the server 140 does not detect a hazardous event in the infrastructure 101.

Figure 3:
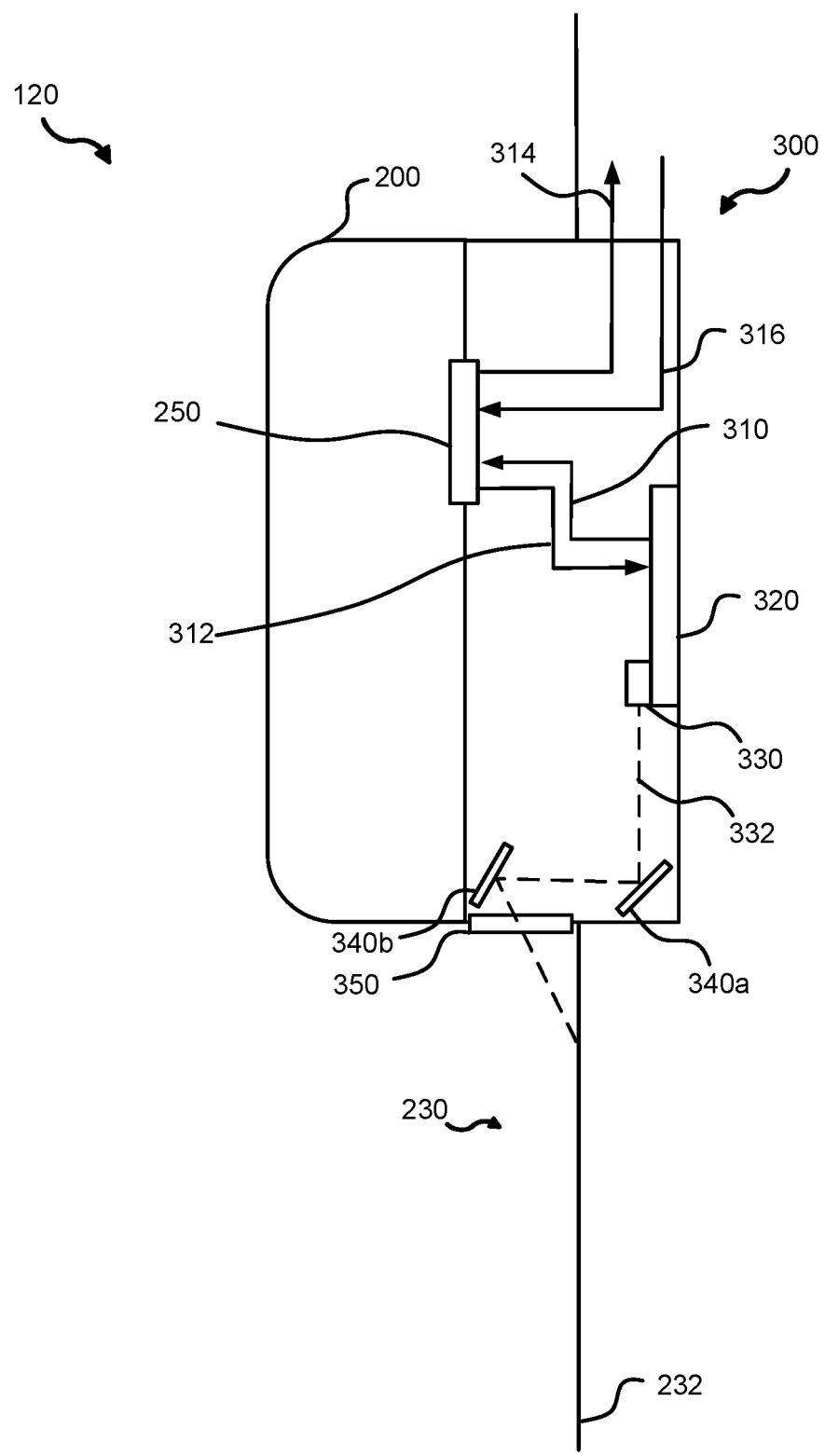
FIG. 3 illustrates an example of a side view of a first integrated notification device in accordance with aspects of the present disclosure.

Referring to FIG. 3, a side view of a first implementation of the integrated notification device 120 may include a message notification device 300 placed behind the alarm notification device 200. The integrated notification device 120 may be mounted into a portion of a wall 232 or on a surface of the wall 232. The alarm notification device 200 may include a terminal block 250 for receiving electrical energy and/or communicating with the server 140 via an input link 316 and an output link 314. The input link 316 may include wired and/or wireless connections that provide direct current (DC) and/or alternating current (AC) electrical energy to the alarm notification device 200 through the terminal block 250. The input link 316 may include wired and/or wireless connections that provide downlink communication channels between the server 140 and the integrated notification device 120. The output link 314 may include wired and/or wireless connections that provide uplink communication channels between the server 140 and the integrated notification device 120.

In some implementations, the message notification device 300 may include a projection control module (PCM) 320. The PCM 320 may receive electrical energy and/or downlink communication via the retrofitted input link 312 connected with the terminal block 250. The PCM 320 may transmit uplink communication via the retrofitted output link 310 connected with the terminal block 250. The retrofitted output link 310 may be connected to the output link 314 through the terminal block 250. The retrofitted input link 312 may be connected to the input link 316 through the terminal block 250. In an aspect of the present disclosure, the message notification device 300 may rely on existing infrastructures and/or hardware associated with the traditional notification tool 200 to communicate with the server 140 and/or receive electrical energy. The PCM 320 may be a printed circuit assembly, a field-programmable gate array, a programmable gate array or other circuit and/or devices.

In some aspects of the present disclosure the PCM 320 of the message notification device 300 may cause a projector 330 to emit light patterns 332 that displays the message received from the server 140. One or more mirrors, or reflective surfaces, 340a, 340b may reflect the light patterns 332 emitted from the projector 330 to display the message in the display area 230 on the wall 232. In an optional implementation, the message notification device 300 may include a lens 350. The lens 350 may amplify, deflect, filter, enhance, and/or process the light patterns 332 reflected off of the one or more mirrors 340a, 340b. In one example, the lens 350 may increase the sizes and/or control the shape of the message displayed in the display area 230. At least some of the components of the integrated notification device 120 may be implemented in other examples described below.

Figure 4:
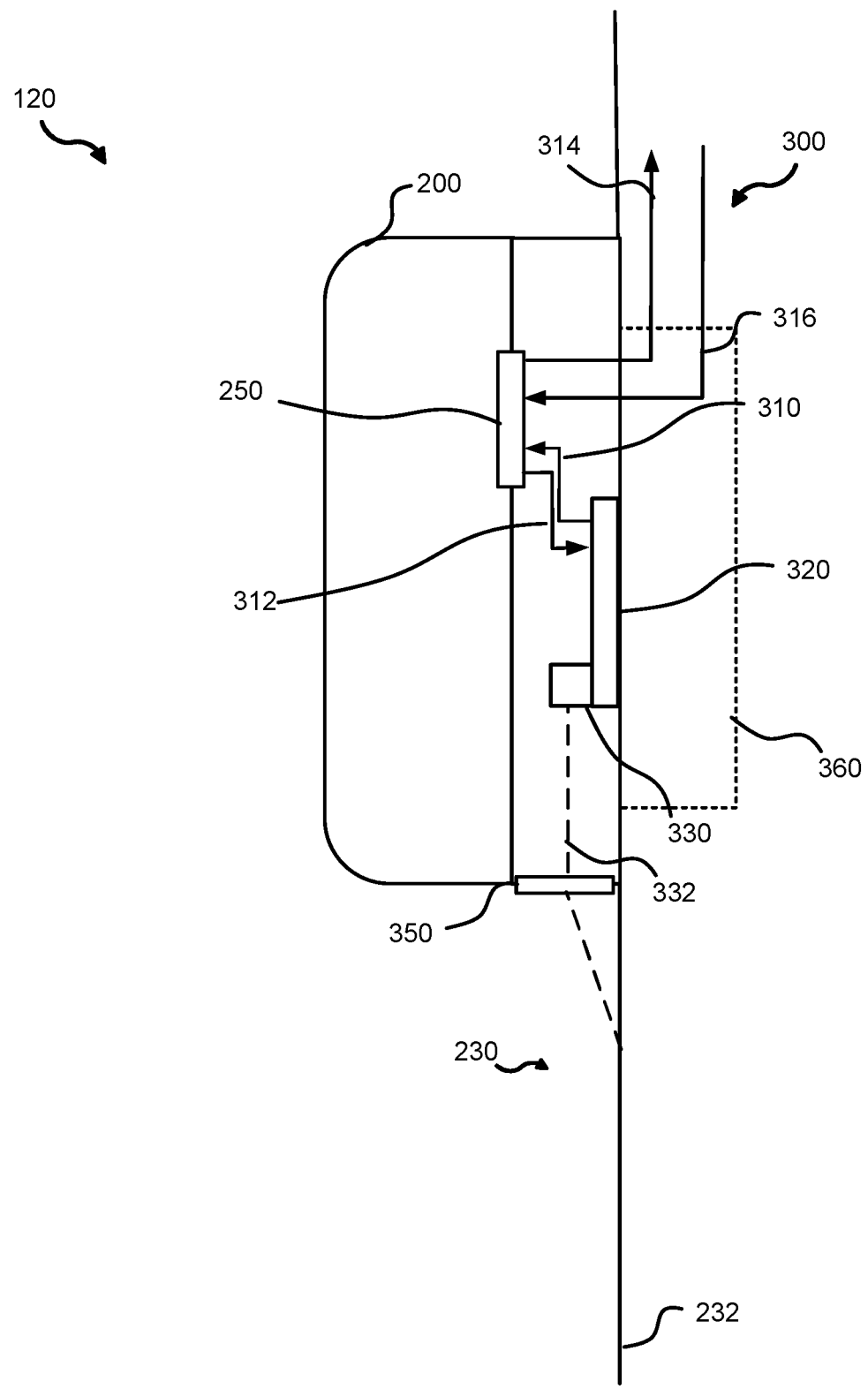
FIG. 4 illustrates an example of a side view of a second integrated notification device in accordance with aspects of the present disclosure.

Referring to FIG. 4, a side view of a second implementation of the integrated notification device 120 may include the message notification device 300 placed behind the alarm notification device 200. The integrated notification device 120 may be mounted on a surface of the wall 232.

In some aspects of the present disclosure the PCM 320 of the message notification device 300 may cause the projector 330 to emit the light patterns 332 that displays the message received from the server 140. The lens 350 may amplify, deflect, filter, enhance, and/or process the light patterns 332 emitted from the projector 330. In one example, the lens 350 may increase the sizes of words and/or control the shape of the message displayed in the display area 230. In another example, the lens 350 may deflect the light patterns 332 toward the display area 230 on the wall 232. In an implementation, the integrated notification device 120 may be mounted to an optional electrical box 360 in the wall 232.

Figure 5:
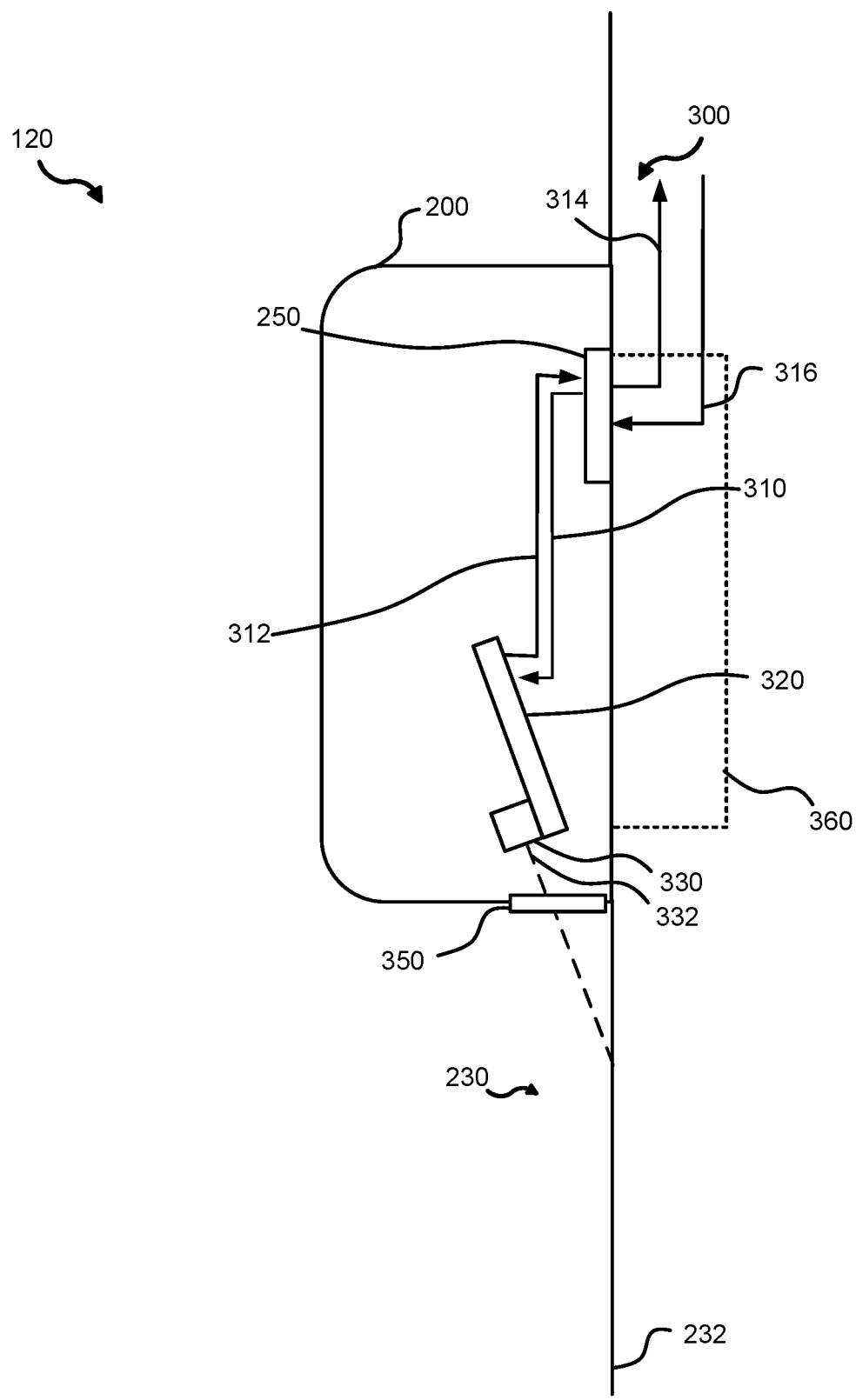
FIG. 5 illustrates an example of a side view of a third integrated notification device in accordance with aspects of the present disclosure.

Referring to FIG. 5, a side view of a third implementation of the integrated notification device 120 may include the message notification device 300 placed within the alarm notification device 200. The integrated notification device 120 may be mounted on a surface of the wall 232

In some aspects of the present disclosure the PCM 320 of the message notification device 300 may cause the projector 330 to emit the light patterns 332 that displays the message received from the server 140. The lens 350 may amplify, deflect, filter, enhance, and/or process the light patterns 332 emitted from the projector 330. In one example, the lens 350 may increase the sizes of words and/or control the shape of the message displayed in the display area 230. In an implementation, the integrated notification device 120 may be mounted to the optional electrical box 360 in the wall 232.

Figure 6:
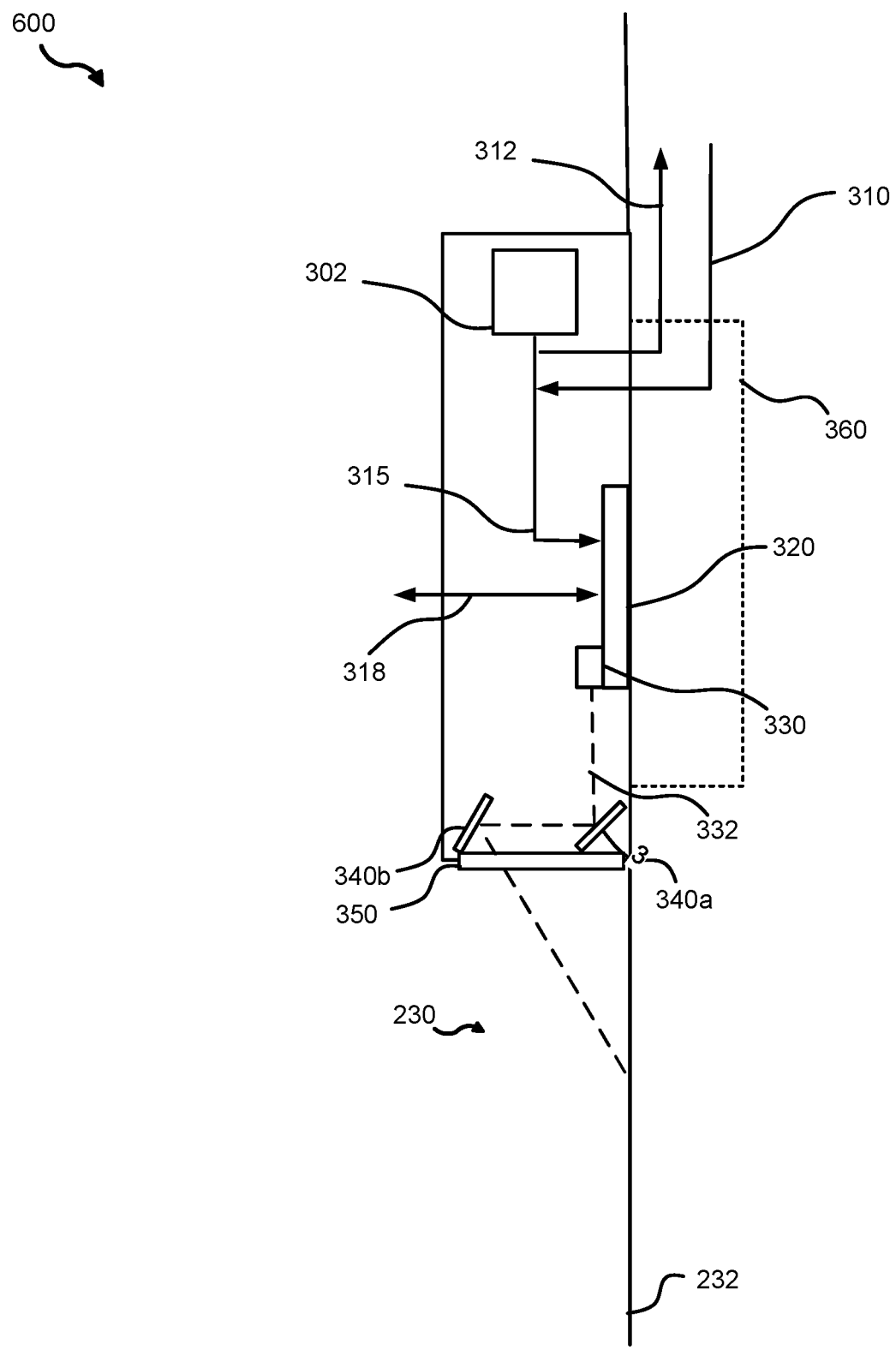
FIG. 6 illustrates an example of a side view of a first message notification device in accordance with aspects of the present disclosure.

Referring to FIG. 6, a side view of a first implementation of a message notification device 600 may be a standalone device that projects messages transmitted by the server 140. In some implementations, the message notification device 600 may be mounted into a portion of the wall 232.

In some aspects of the present disclosure the PCM 320 of the message notification device 600 may cause a projector 330 to emit light patterns 332 that displays the message received from the server 140. One or more mirrors 340a, 340b may reflect the light patterns 332 emitted from the projector 330 to display the message in the display area 230 on the wall 232. In an optional implementation, the message notification device 600 may include a lens 350. The lens 350 may amplify, deflect, filter, enhance, and/or process the light patterns 332 reflected off of the one or more mirrors 340a, 340b. In one example, the lens 350 may increase the sizes of words and/or control the shape of the message displayed in the display area 230. In an implementation, the message notification device 600 may be mounted to an optional electrical box 660 in the wall 232.

Figure 7:
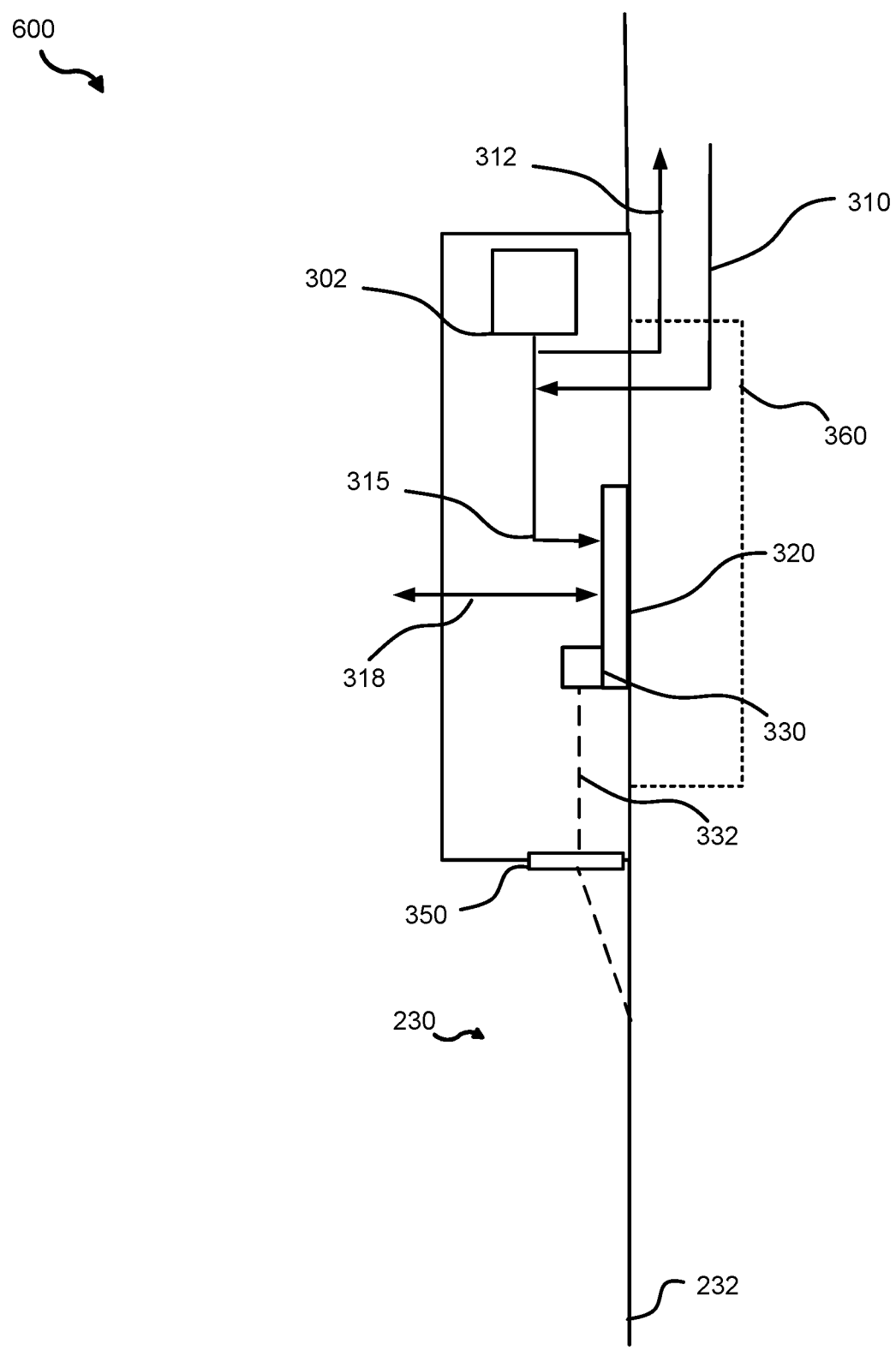
FIG. 7 illustrates an example of a side view of a second message notification device in accordance with aspects of the present disclosure.

Referring to FIG. 7, a side view of another implementation of a message notification device 600 may be a stand-alone device that projects messages transmitted by the server 140. In some implementations, the message notification device 600 may be mounted into a portion of the wall 232.

In some aspects of the present disclosure the PCM 320 of the message notification device 600 may cause the projector 330 to emit the light patterns 332 that displays the message received from the server 140. The lens 350 may amplify, deflect, filter, enhance, and/or process the light patterns 332 emitted from the projector 330. In one example, the lens 350 may increase the sizes of words and/or control the shape of the message displayed in the display area 230. In another example, the lens 350 may deflect the light patterns 332 toward the display area 230 on the wall 232. In an implementation, the message notification device 600 may be mounted to the optional electrical box 660 in the wall 232.

Figure 8:
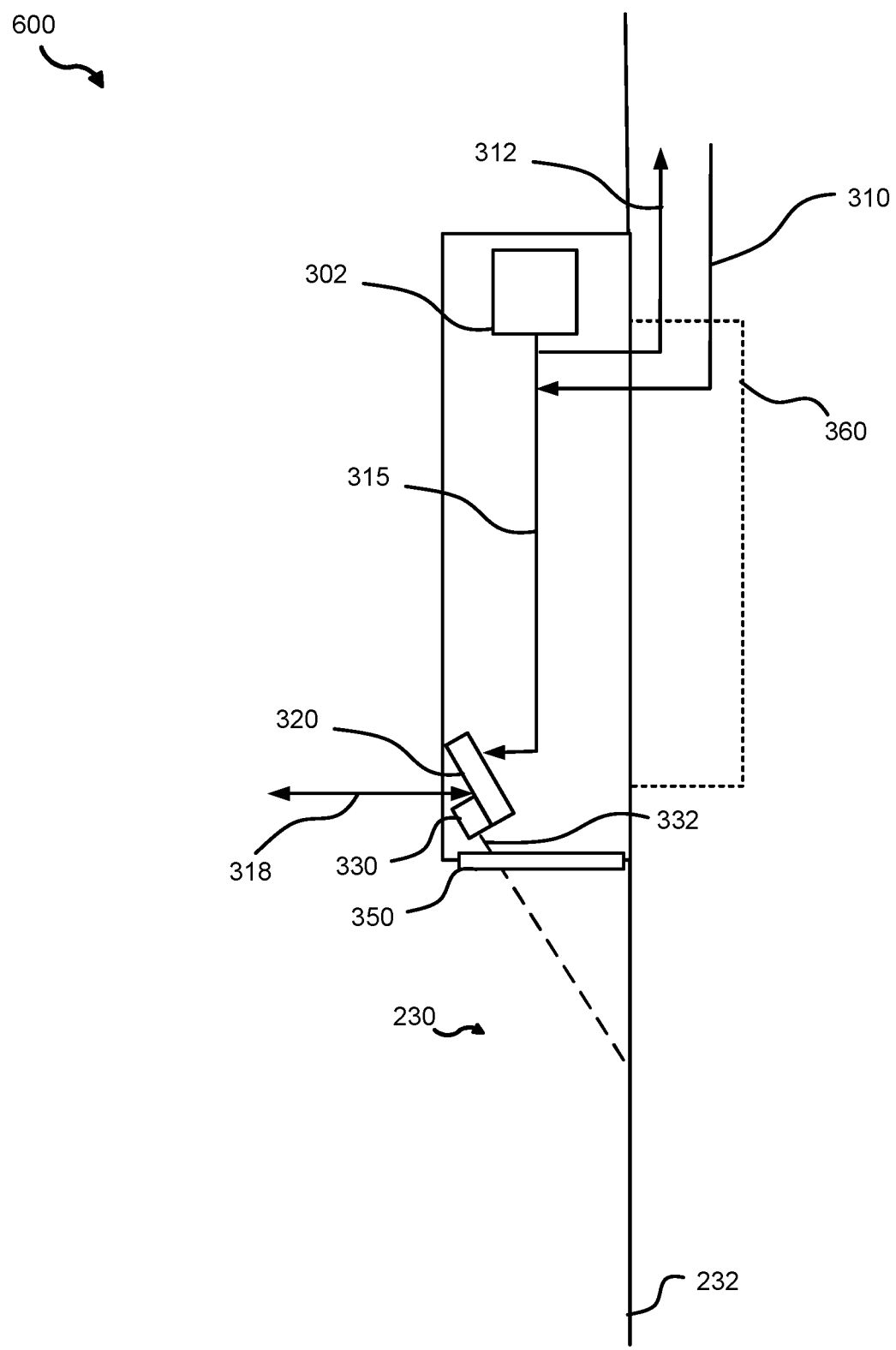
FIG. 8 illustrates an example of a side view of a third message notification device in accordance with aspects of the present disclosure.

Referring to FIG. 8, a side view of another implementation of a message notification device 600 may be a stand-alone device that projects messages transmitted by the server 140. In some implementations, the message notification device 600 may be mounted into a portion of the wall 232.

In some aspects of the present disclosure the PCM 320 of the message notification device 600 may cause the projector 330 to emit the light patterns 332 that displays the message received from the server 140. The lens 350 may amplify, deflect, filter, enhance, and/or process the light patterns 332 emitted from the projector 330. In one example, the lens 350 may increase the sizes of words and/or control the shape of the message displayed in the display area patterns 330. In an implementation, the message notification device 600 may be mounted to the optional electrical box 660 in the wall 232.

Figure 9:
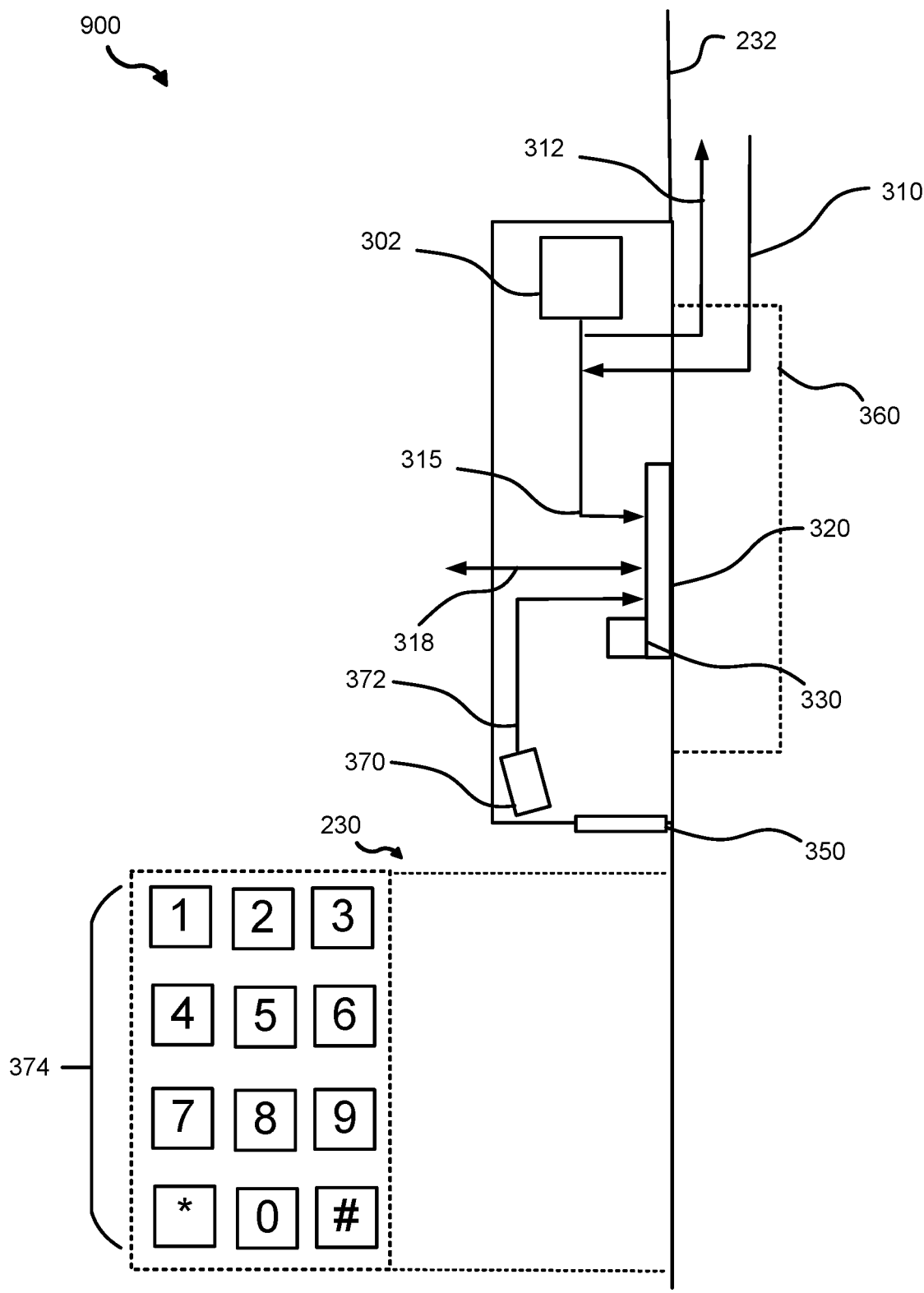
FIG. 9 illustrates an example of a side view of a message notification device with input capabilities in accordance with aspects of the present disclosure.

Referring to FIG. 9, and referencing FIG. 1, a side view of another implementation of a message notification device 900 may be a standalone device that projects messages transmitted by the server 140. The notification device may read input signals in the display area 230. In some implementations, the message notification device 900 may be mounted into a portion of the wall 232. The message notification device 900 may include the battery 902 for receiving electrical energy via the input link 310. The input link 310 may include wired and/or wireless connections that provide direct current (DC) and/or alternating current (AC) electrical energy to the message notification device 900. The battery 902 may store the received electrical energy and provide the electrical energy to components of the message notification device 900. The input link 310 may include wired and/or wireless connections that provide downlink communication channels between the server 140 and the message notification device 900. The message notification device 900 may include the output link 312. The output link 312 may include wired and/or wireless connections that provide uplink communication channels between the server 140 and the message notification device 900.

In some implementations, the message notification device 900 may include the PCM 320. The PCM 320 may receive electrical energy and/or downlink communication via a link 315. The PCM 320 may transmit uplink communication via a wireless link 318 or the link 315. The PCM 320 may receive downlink communication via the wireless link 318.

In some aspects of the present disclosure the PCM 320 of the message notification device 900 may cause the projector 330 to emit light patterns 332 that displays the message received from the server 140. The lens 350 may amplify, deflect, filter, enhance, and/or process the light patterns 332 emitted from the projector 330. In one example, the lens 350 may increase the sizes of words and/or control the shape of the message displayed in the display area 230. In another example, the lens 350 may deflect the light patterns 332 toward the display area 230 on the wall 232. In an implementation, the message notification device 900 may be mounted to the optional electrical box 960 in the wall 232.

In certain aspects of the present disclosure, the message notification device 900 may include a detector 370 that detects motion at least in the display area 230. The detector 370 may include an IR diode and sensor that tracks motions of the occupant's body, such as fingers. The detector 370 may include one or more photodetector that captures images of the occupant's body (e.g., fingers) and perform image analysis to determine the motions. For example, during the occurrence of the hazard 110, the projector 330 may display a virtual number pad 374 in the display area 230 on the wall 232. In another example, the projector 330 may project a single "help" button. An occupant in the infrastructure 101 may be harmed by the hazard 110 (e.g., burnt by the fire, smoke inhalation). In response, the occupant may move his/her finger sequentially over the virtual keys "9-1-1." The detector 370 may detect the motion and transmit a detected signal 372, containing the sequence of "9-1-1," to the PCM 320. The PCM 320 may relay the sequence to the server 140 via the wireless link 318 and/or the output link 312. The server 140, in response to receiving the sequence, may recognize the detected signal 372 as the emergency number for the police department, fire department, and/or emergency medical services. The server 140 may automatically contact the police department, fire department, and/or emergency medical services on behalf of the occupant and summon assistance to the occupant in the infrastructure 101. In some implementations, the server 140 may transmit location data (e.g., coordinate) to the authority to assist in locating the occupant. In certain aspects, the message notification device 900 may support two-way communication for allowing the occupant to communicate with the authority.

In some aspects of the present disclosure, the message notification device 900 may include a link that provides electrical energy to the components of the message notification device 900 (e.g., the PCM 320, projector 330, detector 370, etc.) and a separate link that provides one or more communication channel for uplink and downlink communications.

Figure 10:
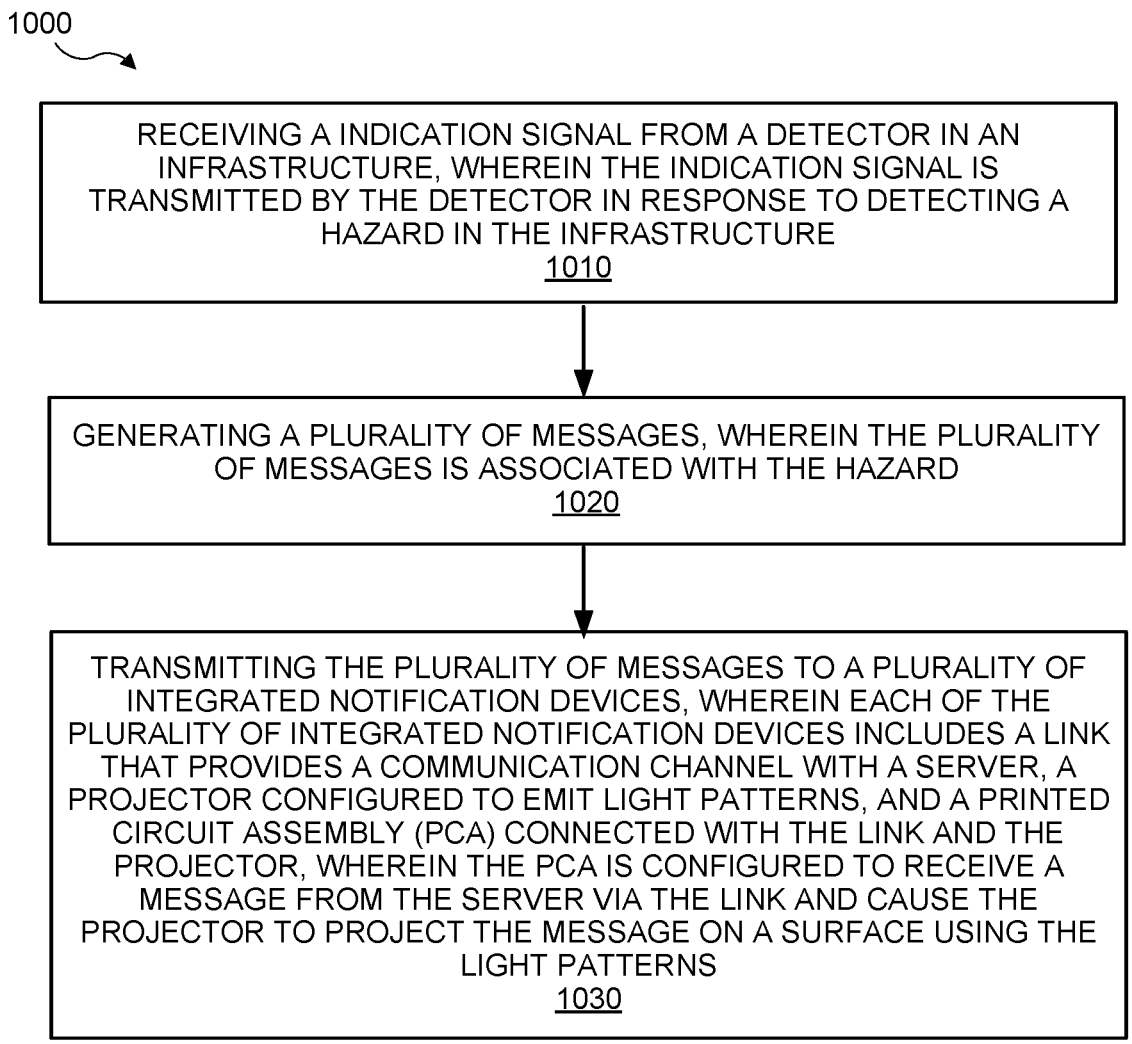
FIG. 10 illustrates an example of a method for mass notification in accordance with aspects of the present disclosure.

Referring to FIG. 10, an example of a method 1000 for mass notification may be performed by the communication component 160, the hazard component 162, the direction component 164, and/or the server 140.

At block 1010, the method 1000 may receive an indication signal from a detector in an infrastructure, wherein the indication signal is transmitted by the detector in response to detecting a hazard in the infrastructure. For example, the communication component 160 of the server 140 may receive an indication signal from the detector 142 in the infrastructure 101. The detector 142 may detect a fire, earthquake, intrusion, active shooter, flood, carbon monoxide leak, or other events that may be dangerous to the occupants of the infrastructure 101. The detector 142 may send the indication signal in response to detecting the hazard 110.

At block 1020, the method 1000 may generate a plurality of messages, wherein the plurality of messages is associated with the hazard. For example, the hazard component 162 and/or the direction component 164 of the server 140 may generate the messages "Evacuate→North Exit," "Evacuate←North Exit," "Evacuate→West Staircase," and "Evacuate←West Staircase." The messages may include recommendations and/or directions for the occupant to safely exit the infrastructure 101 while avoiding the hazard 110. Some or all of the contents of the messages may be predetermined and/or stored in the server 140 and/or the repository 150. For example, the server 140 and/or the repository 150 may store the words/phrases "Warning," "Lockdown," "Stay," "Indoor," "Evacuate," "Return to Room," "Bar Door," "North Exit," "East Staircase," and "West Staircase," and the symbols "←" and "→." Based on the analysis performed by the hazard component 162 and/or the direction component 164, the hazard component 162 and/or the direction component 164 may generate the messages "Evacuate→North Exit," "Evacuate←North Exit," "Evacuate→West Staircase," and "Evacuate←West Staircase."

At block 1030, the method 1000 may transmit the plurality of messages to a plurality of integrated notification devices, wherein each of the plurality of integrated notification devices includes a link that provides a communication channel with a server, a projector configured to emit light patterns, and a projection control module (PCM) connected with the link and the projector, wherein the PCM is configured to receive a message from the server via the link and cause the projector to project the message on a surface using the light patterns. The plurality of messages may be the same message or different messages with different messages being transmitted to different integrated notification devices. For example, the communication component 160 of the server 140 may transmit the messages "Evacuate→North Exit," "Evacuate←North Exit," "Evacuate→West Staircase," and "Evacuate←West Staircase" to the integrated notification devices 120*a*-1. The integrated notification devices 120*a*, 120*b*, 120*c* may receive the message "Evacuate→North Exit." The integrated notification devices 120*d*, 120*e* may receive the message "Evacuate←North Exit." The integrated notification devices 120*f*, 120*g*, 120*h*, 120*i*, 120*j*, 120*k* may receive the message "Evacuate→West Staircase." The integrated notification device 120*l* may receive the message "Evacuate ←West Staircase." In alternative implementations, the server 140 may transmit representations of the messages to the integrated notification devices. For example, if "Evacuate→North Exit" is stored as message 5 in the integrated notification devices 120*a*, 120*b*, 120*c*, the communication component 160 of the server 140 may transmit "message 5" to the integrated notification devices 120*a*, 120*b*, 120*c* to indicate "Evacuate→North Exit."

Figure 11:
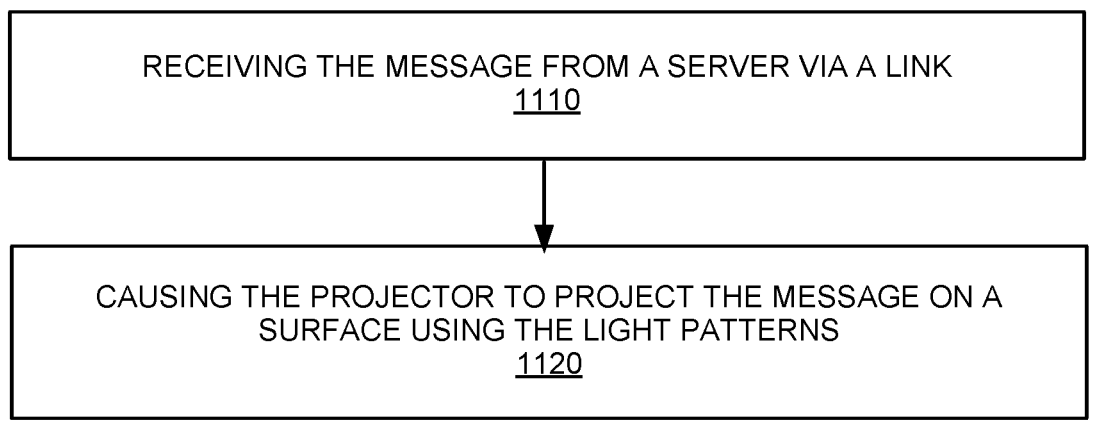
FIG. 11 illustrates an example of a method for displaying a message in accordance with aspects of the present disclosure.

Referring to FIG. 11, an example of a method 1100 for displaying a message may be performed by the PCM 320 and/or the projector 330 of the message notification device 300.

At block 1110, the method 1100 may receive the message, from an alarm notification device via a link. For example, the PCM 320 may receive the message sent by the server 140 and/or the communication component 160 of the server 160 via the input link 316.

At block 1120, the method 1100 may, in response to receiving the message, cause a projector to project a light pattern displaying the message. For example, the PCM 320 may cause the projector 330 to display the message on a surface of the wall 232 in the display area 230.

Figure 12:
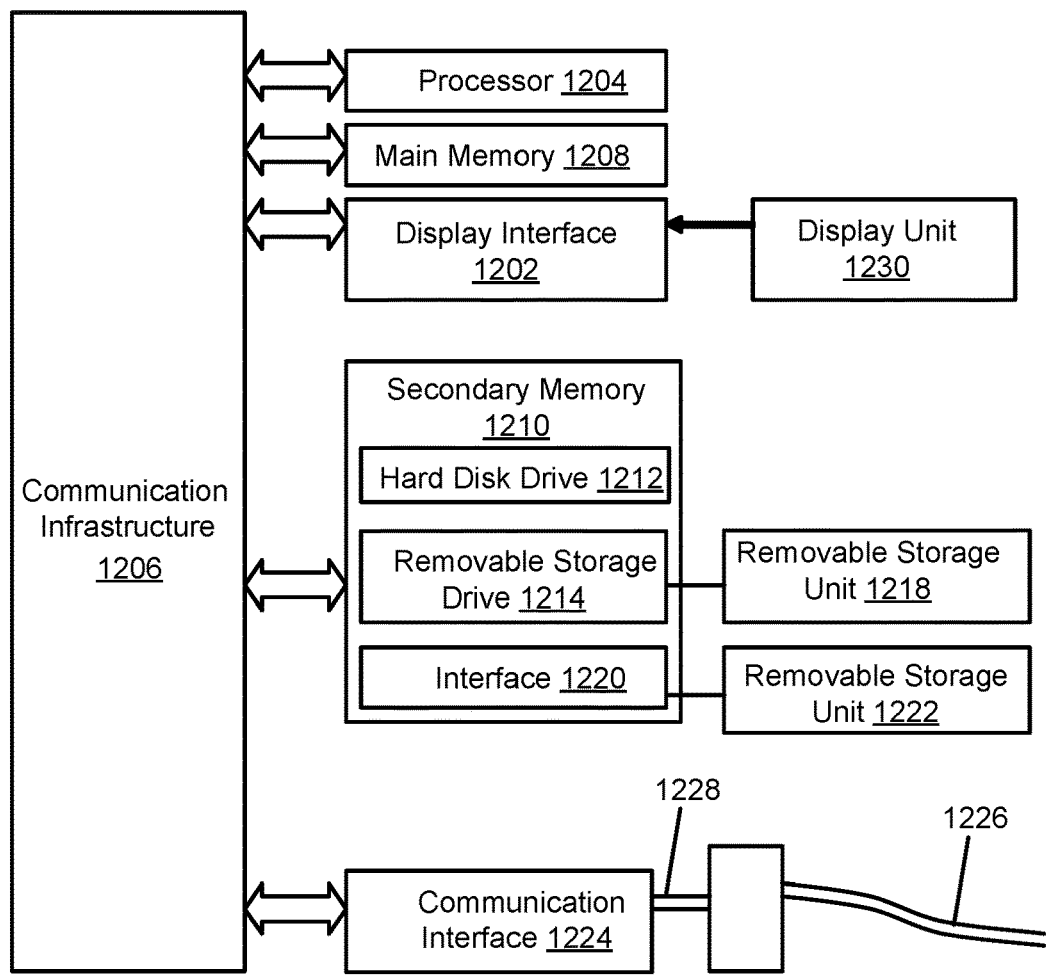
FIG. 12 illustrates an example of a computer system in accordance with aspects of the present disclosure.

Aspects of the present disclosures, such as the server 140 and/or the PCAs 320, 320, 320, may be implemented using hardware, software, or a combination thereof and may be implemented in one or more computer systems or other processing systems. In an aspect of the present disclosures, features are directed toward one or more computer systems capable of carrying out the functionality described herein. An example of such a computer system 1200 is shown in FIG. 12. The server 140 and/or the PCAs 320, 320, 320, may include some or all of the components of the computer system 1200.

The computer system 1200 includes one or more processors, such as processor 1204. The processor 1204 is connected with a communication infrastructure 1206 (e.g., a communications bus, cross-over bar, or network). The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. Various software aspects are described in terms of this example computer system. After reading this description, it will become apparent to a person skilled in the relevant art(s) how to implement aspects of the disclosures using other computer systems and/or architectures.

The computer system 1200 may include a display interface 1202 that forwards graphics, text, and other data from the communication infrastructure 1206 (or from a frame buffer not shown) for display on a display unit 1230. Computer system 1200 also includes a main memory 1208, preferably random access memory (RAM), and may also include a secondary memory 1210. The secondary memory 1210 may include, for example, a hard disk drive 1212, and/or a removable storage drive 1214, representing a floppy disk drive, a magnetic tape drive, an optical disk drive, a universal serial bus (USB) flash drive, etc. The removable storage drive 1214 reads from and/or writes to a removable storage unit 1218 in a well-known manner. Removable storage unit 1218 represents a floppy disk, magnetic tape, optical disk, USB flash drive etc., which is read by and written to removable storage drive 1214. As will be appreciated, the removable storage unit 1218 includes a computer usable storage medium having stored therein computer software and/or data. In some examples, one or more of the main memory 1208, the secondary memory 1210, the removable storage unit 1218, and/or the removable storage unit 1222 may be a non-transitory memory.

Alternative aspects of the present disclosures may include secondary memory 1210 and may include other similar devices for allowing computer programs or other instructions to be loaded into computer system 1200. Such devices may include, for example, a removable storage unit 1222 and an interface 1220. Examples of such may include a program cartridge and cartridge interface (such as that found in video game devices), a removable memory chip (such as an erasable programmable read only memory (EPROM), or programmable read only memory (PROM)) and associated socket, and other removable storage units 1222 and interfaces 1220, which allow software and data to be transferred from the removable storage unit 1222 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a Personal Computer Memory Card International Association (PCMCIA) slot and card, etc. Software and data transferred via communications interface 1224 are in the form of signals 1228, which may be electronic, electromagnetic, optical or other signals capable of being received by communications interface 1224. These signals 1228 are provided to communications interface 1224 via a communications path (e.g., channel) 1226. This path 1226 carries signals 1228 and may be implemented using wire or cable, fiber optics, a telephone line, a cellular link, an RF link and/or other communications channels. In this document, the terms "computer program medium" and "computer usable medium" are used to refer generally to media such as a removable storage drive 1218, a hard disk installed in hard disk drive 1212, and signals 1228. These computer program products provide software to the computer system 1200. Aspects of the present disclosures are directed to such computer program products.

Computer programs (also referred to as computer control logic) are stored in main memory 1208 and/or secondary memory 1210. Computer programs may also be received via communications interface 1224. Such computer programs, when executed, enable the computer system 1200 to perform the features in accordance with aspects of the present disclosures, as discussed herein. In particular, the computer programs, when executed, enable the processor 1204 to perform the features in accordance with aspects of the present disclosures. Accordingly, such computer programs represent controllers of the computer system 1200.

In an aspect of the present disclosures where the method is implemented using software, the software may be stored in a computer program product and loaded into computer system 1200 using removable storage drive 1214, hard drive 1212, or communications interface 1220. The control logic (software), when executed by the processor 1204, causes the processor 1204 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A message notification device, comprising:
   a projector configured to emit light patterns, wherein the projector is mounted on a surface; and a projection control module (PCM) communicatively coupled with the projector and a terminal block of an alarm notification device, wherein the PCM is configured to:
  receive a message from a server via a retrofitted link communicatively coupled with the terminal block, wherein the terminal block of the alarm notification device is configured to receive the message from the server via an existing input link; and
  cause the projector to project the message on the surface using the light patterns.

2. The message notification device of claim 1, further comprises one or more mirrors configured to reflect the light patterns from the projector toward the surface.

3. The message notification device of claim 1, further comprises a lens configured to:
  receive the light patterns; and
  amplify, deflect, filter, enhance, or process the light patterns.

4. The message notification device of claim 1, further comprises at least one detector configured to detect an interaction between a user and the light patterns.

5. The message notification device of claim 4, wherein the PCM is further configured to perform at least one of tracking a location information of the user, transmitting the location information to an authority via the retrofitted link, or providing a two-way communication channel between the user and the authority in response to the at least one detector detecting the interaction.

6. The message notification device of claim 1, further comprises a battery that supplies electrical energy to the message notification device.

7. The message notification device of claim 1, wherein the retrofitted link comprises a wireless communication channel.

8. The message notification device of claim 1, wherein the message is associated with one or more recommendations in response to a fire, security breach, an intruder, an active-shooter, a carbon monoxide leak, an earthquake, severe weather, or a lockdown.

9. The message notification device of claim 1, wherein the message comprises a non-emergency message.

10. The message notification device of claim 1, wherein the message notification device comprises at least one of a strobe light, siren, and audio speaker.

11. An integrated notification device, comprising:
  a terminal block of an alarm notification device configured to receive a message from a server via an existing input link;
  a retrofitted link that provides a communication channel between the terminal block of the alarm notification device and a projection control module (PCM);
  a projector configured to emit light patterns, wherein the projector is mounted on a surface; and
  the PCM connected with the terminal block and the projector, wherein the PCM is configured to:
    receive the message from the server via the retrofitted link; and
    cause the projector to project the message on the surface using the light patterns.

12. The integrated notification device of claim 11, further comprises one or more mirrors configured to reflect the light patterns from the projector toward the surface.

13. The integrated notification device of claim 11, further comprises a lens configured to:
  receive the light patterns; and
  amplify, deflect, filter, enhance, or process the light patterns.

14. The integrated notification device of claim 11, further comprises at least one detector configured to detect an interaction between a user and the light patterns.

15. The integrated notification device of claim 14, wherein the PCM is further configured to perform at least one of tracking a location information of the user, transmitting the location information to an authority via the retrofitted link, or providing a two-way communication channel between the user and the authority in response to the at least one detector detecting the interaction.

16. The integrated notification device of claim 11, further comprises a battery that supplies electrical energy to the PCM.

17. The integrated notification device of claim 11, wherein the retrofitted link comprises a wireless communication channel.

18. The integrated notification device of claim 11, wherein the message is associated with one or more recommendations in response to a fire, security breach, an intruder, an active-shooter, a carbon monoxide leak, an earthquake, severe weather, or a lockdown.

19. The integrated notification device of claim 11, wherein the message comprises a non-emergency message.

20. A method of projecting a message, comprising:
  receiving the message from a terminal block via a retrofitted link communicatively coupled with the terminal block of an alarm notification device, wherein the terminal block of the alarm notification device is configured to receive the message from a server via an existing input link; and
  causing a projector to project the message on a surface using light patterns, wherein the projector is mounted on the surface.

21. The method of claim 20, wherein the message is associated with one or more recommendations in response to a fire, security breach, an intruder, an active-shooter, a carbon monoxide leak, an earthquake, severe weather, or a lockdown.

22. The method of claim 20, wherein the message comprises a non-emergency message.

23. The method of claim 20, wherein receiving the message via the retrofitted link further comprises receiving the message via a wireless communication channel.

* * * * *